United States Patent

[11] 3,602,992

| [72] | Inventor | Norman J. Peters |
| | | Fond Du Lac, Wis. |
| [21] | Appl. No. | 819,148 |
| [22] | Filed | Apr. 25, 1969 |
| [45] | Patented | Sept. 7, 1971 |
| [73] | Assignee | DEC International Inc. |

[54] METHOD AND APPARATUS FOR MAKING CHEESE
8 Claims, 3 Drawing Figs.

[52] U.S. Cl. .................................................... 31/46, 31/47
[51] Int. Cl. ..................................................... A01j 25/00
[50] Field of Search ........................................... 31/47, 46, 48; 99/115, 116

[56] References Cited
UNITED STATES PATENTS
2,494,638  1/1950  Stine .......................... 99/116
2,813,028  11/1957  Jackson, Jr. .................. 99/115

FOREIGN PATENTS
96,624  8/1963  Denmark .......................
1,381,529  11/1964  France ..........................

*Primary Examiner*—Hugh R. Chamblee
*Attorney*—Andrus, Sceales, Starke & Sawall

ABSTRACT: A cheese-making vat comprising a closed vessel having a central vertical shaft and agitator paddles are attached to the lower end of the shaft. During the cheese-making process, a portion of the whey is withdrawn from the upper end of the vat while the agitators are operating. To withdraw the whey, a tube is inserted into the upper end of the vat and the lower end of the tube carries a perforated cylindrical strainer which may be covered by a fabric filter bag. Whey is drawn through the strainer and into the tube.

A generally S-shaped baffle is located ahead of the cylinder in the direction of agitator rotation and serves to protect the strainer from direct impingement by the circulating whey.

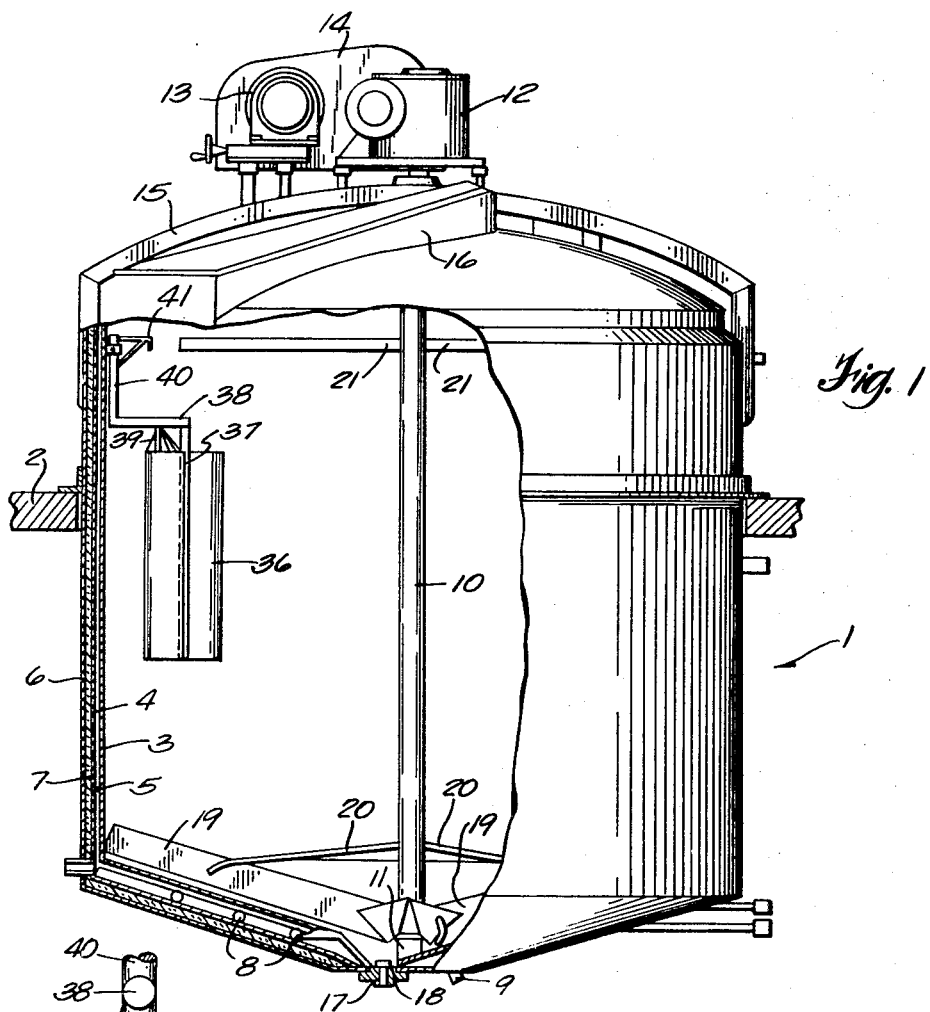
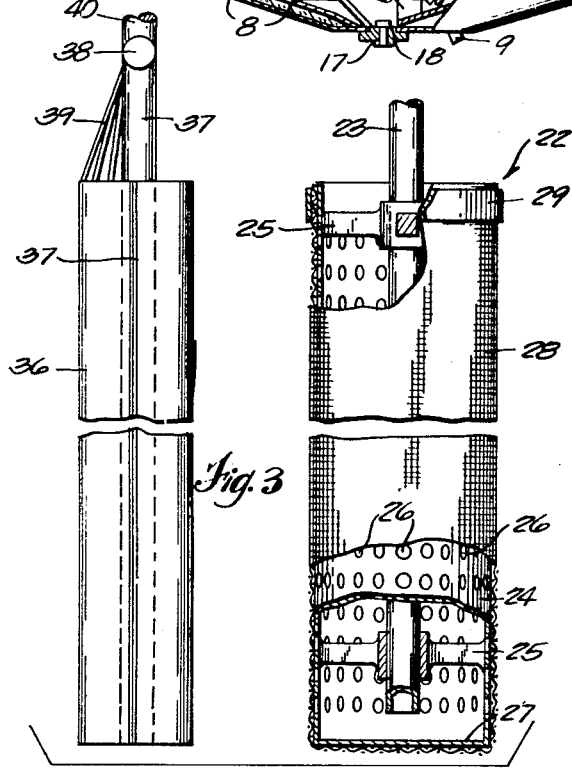
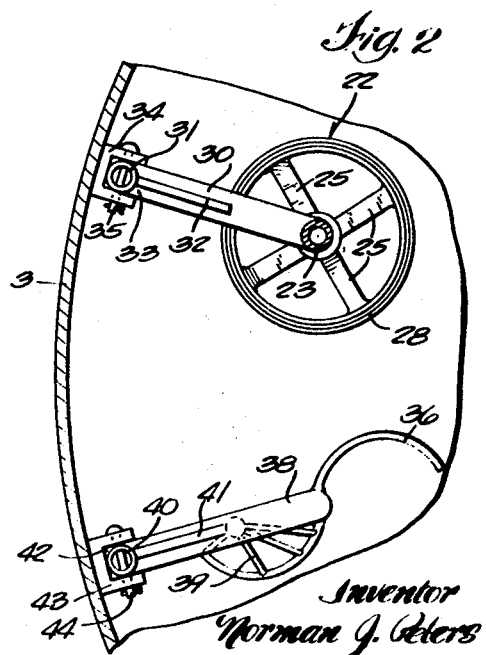
Fig. 1
Fig. 2
Fig. 3
Inventor
Norman J. Peters

METHOD AND APPARATUS FOR MAKING CHEESE

This invention relates to an apparatus and process of cheese making, and more particularly, to an apparatus for predrawing whey from a vertical cheese-making vat.

Recently, there has been increased activity in the use of closed vertical-type chesse-making vats such as that disclosed in copending Pat. application, Ser. No. 708,068 filed Feb. 26, 1968. A vertical cheese-making vat has advantages over the traditional open-top vat, for as the vertical vat is closed a more sanitary design and construction is provided which decreases contamination such as bacteriophage.

The use of vertical vat also reduces the necessary floor space and decreases operating labor on a group installation of the vats. As a further advantage, the vertical cheese-making vat permits maximum use of automatic controls and provides better control of product quality. As the vat is a closed vessel, the vat itself, as well as the various implements used in the cheese-making process, can be cleaned in place after the cheese-making operation.

During the cheese-making process, it is often desired to drain or predraw a portion of the whey from the vat. In this predrawing operation, about 50 to 60 percent of the whey is drained from the vat and draining of the whey subjects the curd is progressively lesser amounts of whey which enhances the quality of the curd. It has been the customary practice to predraw whey from a vertical cheese-making vat by inserting a riser in the drain opening in the bottom of the vat. The riser extends upwardly within the vat and when the drain valve is opened, the portion of the whey above the level of the top of the riser will drain from the tank. As the riser extends upwardly from the bottom of the tank, it is necessary to stop the operation of the agitators during the predraw operation even though it is recognized that stopping the agitation tends to cause the curd to mat.

The present invention is directed to an improvement in the predrawing procedure for a vertical cheese-making vat. In accordance with the invention, the vat comprises a closed vessel having a central vertical shaft and agitator paddles are attached to the lower end of the shaft. During the cheese-making process, a portion of the whey is withdrawn from the upper end of the vat while the agitators are operating. To withdraw the whey, a tube is inserted into the upper end of the vat and the lower end of the tube carries a perforated cylindrical strainer which may be covered by a nylon fabric bag. They whey is drawn through the strainer and into the tube by operation of a vacuum pump.

Located ahead of the strainer, in the direction of agitator rotation, is a generally S-shaped baffle. The baffle tends to direct the circulating whey, both radially inward toward the shaft and radially outward toward the wall of the vat, thereby preventing direct impingement of the circulating whey on the strainer.

By use of the predrawing unit of the invention, the whey can be withdrawn from the vat while continuously agitating the curd, thereby eliminating any tendency for the curd to mat.

The perforated cylinder or strainer is provided with very small openings, resulting in a fine filtering or screening action for the whey. If the strainer is covered with a fabric bag, the openings in the strainer can be larger, for the filtering action is provided by the fine weave or mesh of the bag.

Both the predrawing unit and the S-shaped baffle are suspended from a bracket attached to the sidewall of the vat and can be readily installed and removed after the predrawing operation.

The drawings illustrate the best mode presently contemplated of carrying out the invention. In the drawings:

FIG. 1 is a side elevation of the vertical cheese-making vat with parts broken away in section and showing the predrawing unit of the invention;

FIG. 2 is an enlarged fragmentary horizontal section showing the attachment of the predrawing unit and the S-baffle; and FIG. 3 is a side elevation of the predrawing unit with parts broken away in section.

The drawings illustrate a vertical cheese-making vat 1 which is mounted within an opening in the floor 2 or foundation. With this through the floor mounting, the upper portion of the vat is located in the upper level or the second story of the building, while the lower portion of the vat extends downwardly to the the lower level of the building or basement. The vat 1 can be used for making various types of cheese such as Swiss, cheddar, colby, granulated, Italian, etc.

As shown in FIG. 1, the vat 1 includes an inner vessel or tank 3 formed of stainless steel and the like, and a jacket 4 surrounds he vessel 3 with the space between the vessel and the jacket defining a heating chamber 5. An outer casing 6 is spaced around the jacket 4 and an insulating material 7 is located within the space between the jacket 4 and the casing 6 to prevent heat loss to the atmosphere.

During the cooking operation, a heating medium, such as steam is introduced into the heating chamber 5 through a series of concentric spray rings 8 located in the chamber 5 beneath the bottom surface of the vessel. Steam is ejected from the rings 8 through a series of nozzles and the condensate flows down the conical bottom surface of the jacket 4 and is conducted to a drain through the outlet 9.

Located centrally within the vat 1 is a drive shaft 10 and the lower end of the shaft is journaled within a bearing block 11 mounted on the bottom surface of the vessel 3. The upper end of the shaft 10 extends through an opening in the upper end of the vat and is connected to a speed-reducing mechanism 12 driven by a motor 13 through a belt drive contained within the housing 14. The motor operates through the speed reduction mechanism 12 to rotate the shaft 10 about its axis. The motor 13 and speed-reducing mechanism 12 are supported on the upper end of the vat by a frame 15.

Access to the interior of the vat is obtained through an opening in the upper surface which is enclosed by a removable cover 16. The cover extends from the periphery of the vat inwardly toward the center with the length of the opening being slightly greater than the radius of the vat so that various implements used in the cheese-making process can be inserted and withdrawn through the opening. In some instances, the opening may extend completely across the vat.

The lower end of vessel 3 is provided with a drain opening 17 offset from the shaft 10, and the opening is opened and closed by a valve 18.

A pair of agitator paddles 19 are connected to the lower end of the shaft and are adapted to rotate with the shaft. Paddles 19 extend upwardly at an inclined angle and are generally parallel to the conical bottom surface of the vessel 3. Braces 20 extend between the outer ends of the paddles and the shaft 10.

In addition to the paddles 19, the shaft also carries a pair of radially extending arms 21 from which a series of cheese-making implements are suspended during various periods of the cheese-making operation. As disclosed in the copending U.S. Pat. application, Ser. No. 708,068, filed Feb. 26, 1968, the implements can consist of curd-cutting knives, rotating breaker paddles, baffles, and the like.

It is common practice in some cheese-making processes, particularly Swiss and cheddar, to predraw about 50 to 60 percent of the whey of the vat, and this subjects the curd to progressively lesser amounts of whey which enhances the quality of the curd. According to the invention, a predrawing unit 22 is inserted into the vat 1 through the opening in the upper end and a portion of the whey is withdrawn by this unit 22. The predrawing unit 22 includes a tube 23 having its upper end connected to a vacuum pump or other source of subatmospheric pressure, and the lower end of tube 23 extends within a perforated cylinder 24. The tube 23 is spaced from the cylinder by a pair of spider supports 25. Cylinder 24 is provided with a series of openings 26, generally in the range of about 1/16-inch diameter, and the lower end of the cylinder is enclosed by a plate 27.

In the form of the invention shown in the drawings, the curd fines are screened from the whey being withdrawn from the tank by a woven mesh or fabric bag 28 which is secured around the cylinder 24. Bag 28 is preferably formed of nylon, and the upper end of the bag is attached around the cylinder by an elastic band 29. Bag 34 has a fine weave which serves to screen out the curd fines from the whey which is being drawn through the bag to the tube 23. In an alternate construction, the holes 26 in the cylinder 24 can be formed with a small diameter of about 0.033 inch, in which case the cylinder 24 serves as the strainer and the fabric bag 28 can be eliminated.

To support the predrawing unit from the wall of the vat 1, a horizontal arm 30 is connected to the tube 23 and the outer end of arm 30 is attached to the lower end of the vertical arm 31. The upper end of vertical arm 31 is provided with a handle 32 which is used not only to handle or transport the unit but also to support the unit within the vat during the clean-in-place operation. As best shown in FIG. 2, the vertical arm 31 is disposed within a slot 33 formed in a bracket 34 mounted on the wall of the vessel 3. A pin 35 extends through the aligned openings in the bracket 34 and vertical arm 31 and serves to retain the arm within the bracket.

Located ahead of the predrawing unit 22, in the direction of agitator rotation, is a baffle 36 having a generally S-shaped cross section. The central portion of baffle 36 is attached to a vertical support rod 37 and the upper end of vertical rod 37 is connected to an end of a horizontal arm 38. In addition, a wire frame 39 connects the upper edge of the baffle 36 to the arm 38.

The outer end of horizontal arm 38 is connected to the lower end of a vertical arm 40, and a handle 41, similar to handle 30, is provided on the upper end of vertical arm 40.

To mount the baffle 36 to the inner tank or vessel 3, the vertical arm 40 is inserted within the slot 42 in a bracket 43 connected to tank 3. A pin 44 extends through aligned openings in the bracket 43 and vertical arm 40 to lock the vertical arm in position.

As best shown in FIG. 2, the S-shaped baffle 36 is located ahead, in the direction of agitator rotation, of the predrawing unit 22 and as the S-baffle 36 is fixed or stationary, the circulating whey will impinge against the baffle and a portion of it will be directed radially outward toward the tank 3 while a second portion of the circulating whey will be directed radially inward toward the shaft 10. THe S-baffle prevents the circulating whey from impinging directly on the strainer, thereby providing a more static or quiescent condition in the area of the predrawing unit 22 which aids in the passage of the whey through the strainer and into the tube 23.

As the whey is withdrawn from the upper end of the vat, the agitators 19 can operate continuously during the predrawing operation. Continuous agitation prevents the curd from matting and thereby provides a more desirable curd.

As the strainer, which can be either the bag 28 or the cylinder 24 having a series of small diameter holes, has a fine porosity, it aids in screening the curd fines from the whey and reduces the proportion of curd fines in the whey being withdrawn.

The predrawing unit 22 and the S-baffle 36 can be readily mounted in he tank by attachment to the brackets on the tank wall. During the clean-in-place operation, the predrawing unit 22 and baffle 36 can be suspended from the arms 21 along with other implements used in the various phases of the cheese-making process.

I claim:

1. In a cheese-making apparatus, a closed vessel to contain curds and whey and including a sidewall, a bottom wall and a top wall, said top wall having an opening therein, a cover to removably enclose the opening in the top wall, a central vertical drive shaft disposed within the vessel, drive means for rotating he shaft, agitating means connected to the lower end of the shaft and extending radially to adjacent the sidewall for agitating he curds and whey in the vessel, mounting means disposed on the inner surface of the sidewall of the vessel adjacent the top wall and disposed in vertical alignment with said opening, and a whey-drawing unit to be removably secured to said mounting means, said whey-drawing unit including a conduit extending downwardly within the vessel and having a strainer member of open construction attached to the lower end of said conduit and located above the agitating means, the upper end of said conduit disposed to be connected to a source of vacuum, said whey-drawing unit also including a supporting member connected to the conduit and removably engaged with said mounting means, said whey-drawing unit to be inserted into the vessel through the opening in the top wall and serving to withdraw a portion of the whey in the vessel through said strainer member to the exterior of the vessel.

2. The apparatus of claim 1, wherein said conduit means include a perforated tubular member located within the vessel and said strainer means comprises a woven fabric bag disposed around said perforated tubular member.

3. The apparatus of claim 1, and including the baffle disposed ahead of said conduit means in the direction of rotation of said agitating means, said baffle preventing the circulating whey from directly impinging on said strainer means.

4. The apparatus of claim 3, wherein said baffle is generally coextensive in a vertical direction with said strainer means.

5. The apparatus of claim 3, wherein said baffle has a generally S-shaped cross section.

6. In cheese-making apparatus, a vessel to contain the curds and whey, a central vertical shaft disposed within the vessel, drive means for rotating the shaft, agitating mean connected to the lower end of the shaft for agitating the curds and whey in the vessel, conduit means extending downwardly within the vessel, a strainer member of open construction attached to the lower end of said conduit means and located above the agitating means, means for connecting the upper end of said conduit means to a source of vacuum, and a fixed baffle member located ahead of said conduit means in the direction of rotation of said agitating means, said baffle preventing the circulating whey from directly impinging on said strainer member, a portion of said whey being screened through said strainer member and withdrawn through said conduit means to the exterior.

7. The apparatus of claim 6, and including drain means in the bottom of the vessel for draining the remaining portion of the whey.

8. The apparatus of claim 6, wherein said baffle includes a pair of vertically extending sections, one of said sections being arranged to direct the circulating curds and whey outwardly toward vessel wall and the other of said sections being arranged to direct the whey inwardly toward said shaft.